United States Patent [19]

Kagata

[11] 4,066,267
[45] Jan. 3, 1978

[54] KNIFE-EDGE BEARING SYSTEM

[75] Inventor: Akira Kagata, Neyagawa, Japan

[73] Assignee: Matsushita Electric Industrial Co., Ltd., Japan

[21] Appl. No.: 665,906

[22] Filed: Mar. 11, 1976

[30] Foreign Application Priority Data

Mar. 17, 1975 Japan .............................. 50-36323[U]
Jan. 20, 1976 Japan .............................. 51-5347[U]

[51] Int. Cl.² .............................................. G11B 3/10
[52] U.S. Cl. .................................... 274/23 R; 308/10
[58] Field of Search ................ 274/23 R; 308/10, 2 R

[56] References Cited

U.S. PATENT DOCUMENTS

| 1,806,179 | 5/1931 | Reeves | 308/2 R |
| 2,551,506 | 5/1951 | Rockwell | 274/23 R |
| 2,643,887 | 6/1953 | Andres | 274/23 R |

Primary Examiner—Harry N. Haroian
Attorney, Agent, or Firm—Burgess, Ryan and Wayne

[57] ABSTRACT

Magnets are attached to both ends of a knife-edge member pivotably received by a knife-edge bearing member while magnets are disposed in opposed relation with the first-mentioned magnets so that the displacement in the longitudinal direction of the knife-edge member may be prevented by the magnetic repulsive forces interacting between the first and second mentioned magnets.

5 Claims, 5 Drawing Figures

KNIFE-EDGE BEARING SYSTEM

BACKGROUND OF THE INVENTION

The present invention relates to a knife-edge type bearing system.

In general, the conventional knife-edge type bearings comprise a knife-edge member, a bearing member adapted for making line contact with the edge of the knife-edge member for pivotal movement thereof, and side plates positioned on both sides of the bearing member for preventing the displacement in the longitudinal direction of the knife-edge member. Pointed edges are extended from both ends of the knife-edge member and are brought into contact with the side plates with a minimum contact area for permitting the smooth pivotal movement of the knife-edge member.

The conventional knife-edge bearings with the above construction are objectionable for the following reasons:

a. In general, the knife-edge bearings are used in, for instance, a balance where a nearly frictionless bearing must be provided. But the pointed edges extended out of the ends of the knife-edge member are brought into contact with the side plates so that the inevitable friction losses occur between them even when the area of contact between them is minimized; and b. In order to minimize wear, the knife-edge member is, in general, made of a jewel such as rubby, sapphire, agate, etc. or hardened steel, but the pointed-edges tend very frequently to be broken under the external impacts resulting in the increase in frictional force between the pointed edges and the side plates.

A knife-edge bearing without side plates may be conceived, but cannot be successfully used in practice because of the free displacement in the longitudinal direction of the knife-edge member.

OBJECTS OF THE INVENTION

In view of the above, one of the objects of the present invention is to provide a bearing system in which the knife-edge member is not provided with pointed-edges for contact with the side plates, but its displacement in the longitudinal direction may be positively prevented by the repulsive forces interacting between the opposite poles of magnets so that the stable, reliable, dependable and smooth operation is assured.

Another object of the present invention is to provide a bearing system in which the displacement in the longitudinal direction of the knife-edge member may be prevented by the repulsive forces interacting between the magnets so that parts which make frictional contact with other parts may be reduced in number and that the fear of breakdown of pointed-edges may be eliminated and consequently the extremely stable operation is assured.

The present invention provides a bearing system in which either of a knife-edge member or a bearing member for receiving said knife-edge member is in a stationary condition while the other is in a movable condition, movable magnets are attached to both ends of said knife-edge member or bearing member, and stationary magnets are arranged in opposed relation with said movable magnets, whereby the displacement in the longitudinal direction of said knife-edge member or bearing member may be prevented by the repelling forces interacting between said stationary and movable magnets.

Figure 1:
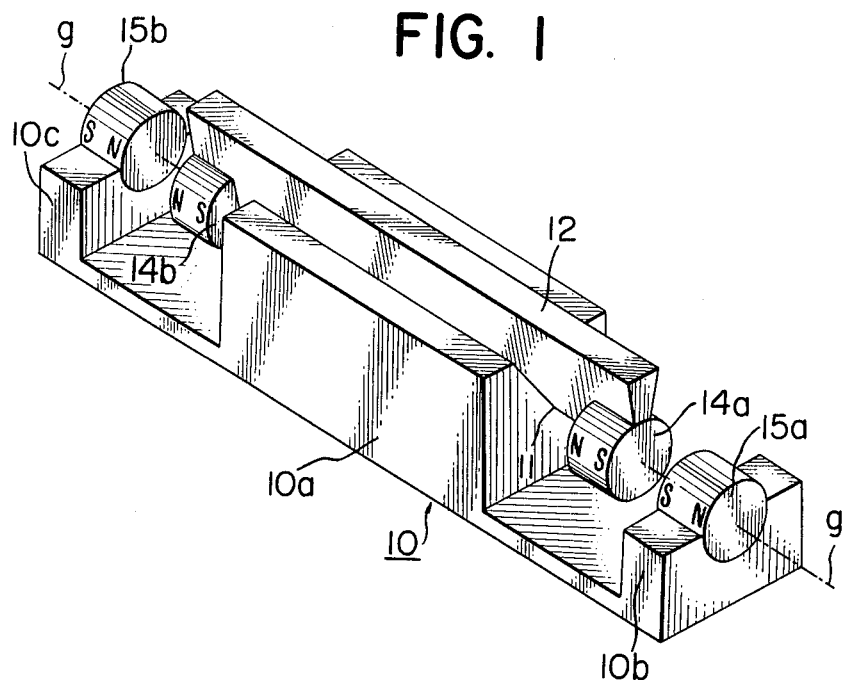
FIG. 1 is a schematic perspective view of a bearing system in accordance with the present invention.

DESCRIPTION OF THE PREFERRED EMBODIMENT:

In FIG. 1, there is shown a knife-edge bearing system in accordance with the present invention comprising a bearing stand 10 including a main body 10a with a V-shaped groove 11 for receiving therein a knife-edge member 12 with the edge thereof in line contact with the bottom of the V-shaped groove 11. Since the bearing stand 10 and the knife-edge member 12 are substantially similar in construction to those of the conventional knife-edge bearings, no further detailed description shall be made in this specification.

Disk-shaped movable magnets 14a and 14b are attached to both ends of the knife-edge member 12 coaxially of the axis $g$ of rotation or pivotal movement of the knife-edge member 12, and are magnetized in the axial direction thereof. In opposed relation with the movable disk-shaped magnets 14a and 14b are disposed stationary disk-shaped magnets 15a and 15b, respectively, which are mounted on supports 10b and 10c, respectively, attached to or formed integral with the bearing stand 10 and spaced apart from the end surfaces of the main body 10a by the same distance. These stationary magnets 15a and 15b are so magnetically oriented that their inner poles may have the same polarities with those of the opposing poles of the movable magnets 14a and 14b. More particularly, in the present embodiment the S-pole of the stationary magnet 15a is oriented in opposed relation with the S-pole of the movable magnet 14a while the N-pole of the stationary magnet 15b is oriented in opposed relation with the N-pole of the movable magnet 14b. Therefore, the displacement in the longitudinal direction of the knife-edge member 12 may be prevented by the magnetic repulsive forces interacting between the movable and stationary magnets 14a and 15a and between the movable and stationary magnets 14b and 15b.

So far the bearing stand 10 has been described as being stationary while the knife-edge member 12 as being movable or pivotable, but it is to be understood that the bearing stand 10 may be in a movable condition while the knife-edge member may be in a stationary condition.

Figure 2:
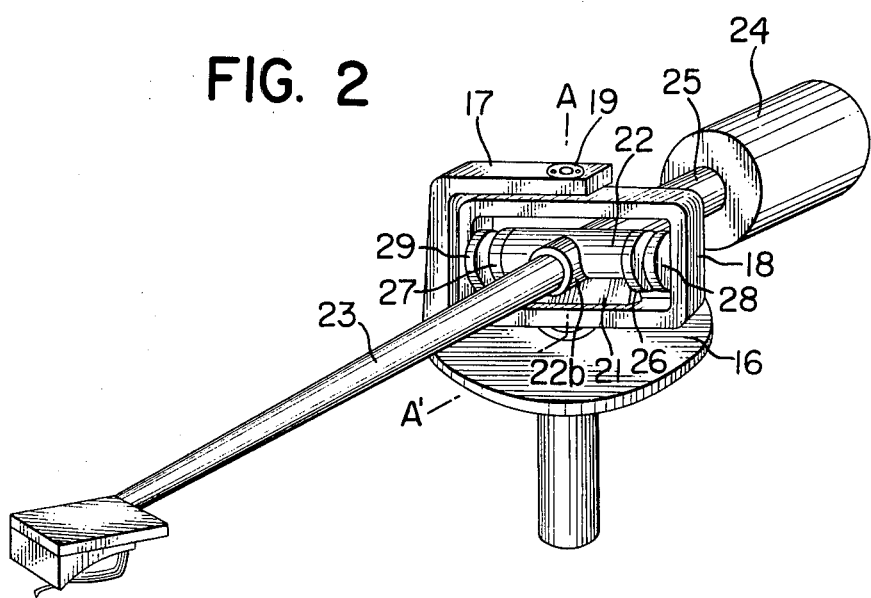
FIG. 2 is a schematic view of a pickup arm system incorporating therein the bearing system shown in FIG. 1.
Figure 3:
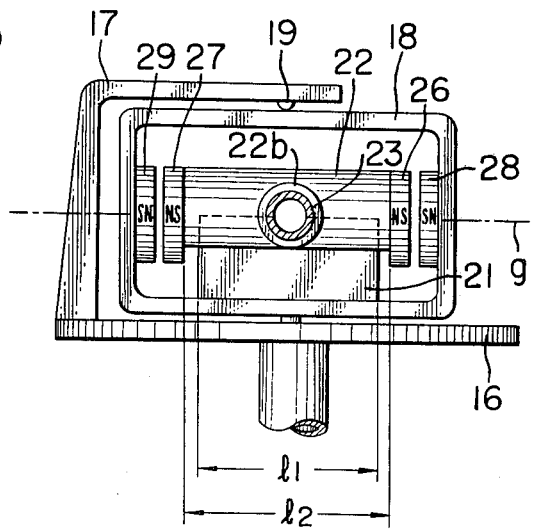
FIG. 3 is a front view thereof.
Figure 4:
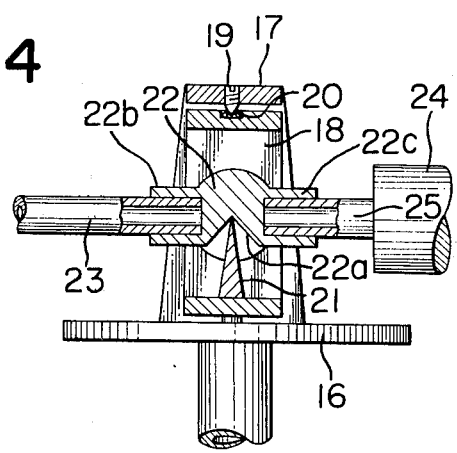
FIG. 4 is a sectional view taken along the line A-A' of FIG. 2.

FIGS. 2, 3 and 4 shows a pickup arm system incorporating the knife-edge bearing system in accordance with the present invention. The pickup arm system includes a base 16, an L-shaped supporting member 17 with a leg extended upright from the periphery of the base 16 and with an arm extended horizontally from the upper end of the upright leg radially inwardly toward the axis of the base 16, and a rectangular frame 18 pivoted between the L-shaped supporting member 17 and the base 16 for rotation about the axis coaxial of the base 16, a pivot 19 which is screwed into and extended downward from the arm of the L-shaped supporting member 17 being received in a bearing member 20 embedded in or attached to the upper arm of the rectangular frame 18 in line with the axis of rotation thereof as best shown in FIG. 4. A knife-edge member 21 with its edge directed upward is attached on the lower arm of the rectangular frame 18, and the edge of the knife-edge member 21 is brought into line contact with the bottom of an inverted V-shaped groove 22a formed at the bottom side of a transverse arm of a cross-shaped pickup arm supporting member 22 so that the pivotal movement about the edge of the knife-edge member 21 of the supporting member may be permitted.

The pickup arm system further includes a tone arm 23 whose one end carries a pickup cartridge or head and the other end is firmly fitted into a front longitudinal arm 22b of the cross-shaped pickup arm supporting member 22, and a counter weight 24 whose mounting shaft 25 is firmly fitted into a rear longitudinal arm 22c of the supporting member 22 as best shown in FIG. 4.

As shown in FIG. 3, the length $l_1$ of the knife-edge member 21 is selected slightly smaller than the length $l_2$ of the V-shaped groove 22a of the pickup arm supporting member 22.

Movable disk-shaped magnets 26 and 27, which correspond to the movable magnets 13 and 14 shown in FIG. 1, are attached to both ends, respectively, of the transverse arm of the pickup arm supporting member 22 while stationary disk-shaped magnets 28 and 29, which correspond to the stationary magnets 15 and 16 shown in FIG. 1, are attached to the upright legs of the rectangular frame 18 in opposed relation with the movable magnets 26 and 27, respectively, as best shown in FIG. 2. As the knife-edge bearing system shown in FIG. 1, the movable and stationary magnets 26, 27, 28 and 29 are so disposed that their axes are in line with the axis of rotation or pivotal movement of the transverse arm of the cross-shaped pickup supporting member 22 and that the poles with the same polarity of the movable and stationary magnets are in opposed relation as best shown in FIG. 3.

In the pickup arm system with the above construction, the displacement in the longitudinal direction of the transverse arm of the cross-shaped supporting member 22 may be positively prevented by the magnetic repulsive forces interacting between the movable magnets 26 and 27 and the stationary magnets 28 and 29 so that the smooth pivotal movement of the pickup arm 23 may be ensured.

Figure 5:
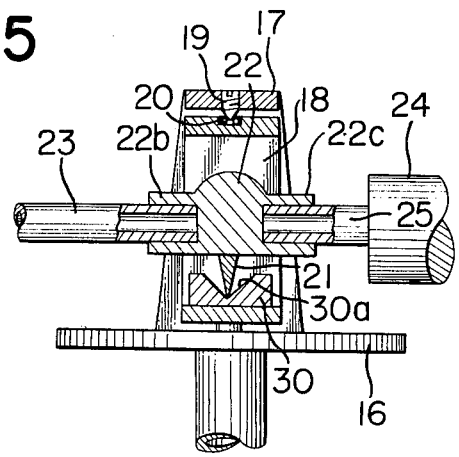
FIG. 5 is a sectional view of a modification of the system shown in FIG. 2.

In FIG. 5, there is shown a variation of the pickup arm system in accordance with the present invention, which variation is substantially similar in construction to the pickup arm system described above with reference to FIGS. 2, 3 and 4 except that the knife-edge member 21 is attached to the cross-shaped pickup arm supporting member 22 while a knife-edge bearing member 30 with a V-shaped groove 30a is attached to the lower arm of the rectangular frame 18 for line contact with the edge of the knife-edge member 22.

As described above, one of the novel features of the present invention resides in the fact that the displacement in the longitudinal direction of the knife-edge member may be prevented by the repulsive forces interacting between the opposed poles with the same polarity of the movable and stationary magnets. Therefore, the parts which make moving contact with other parts may be considerably reduced in number as compared with the conventional bearing systems. Furthermore, opposed to the conventional knife-edge bearings, it is not necessary to form pointed edges at the ends of the knife-edge member for contact with the side plates so that there is no fear of breakdown of the pointed edges and consequently the stable and reliable operation may be ensured.

What is claimed is:

1. A knife-edge bearing system comprising a knife-edge member and a bearing member for receiving said knife-edge member, one of said members being stationary and the other member being movable, first and second magnets attached to opposite ends of said movable member, and third and fourth stationary magnets arranged in opposed relation with said first and second magnets, respectively whereby the displacement in the longitudinal direction of said movable member may be prevented by the interacting repulsive forces between said first and third and said second and fourth magnets respectively.

2. A knife-edge bearing system as set forth in claim 1, wherein said knife-edge member is movable, the edge of said knife-edge member is in contact with the bottom of a V-shaped groove formed in said bearing member, said stationary member comprises (i) a main body having said groove opposed end surfaces adjacent said groove, and (ii) a pair of supporting members facing respective ones of said end surfaces, and said stationary magnets are mounted in opposed relation with said first and second magnets on said supporting members disposed in opposed relation with the end surfaces of said main body.

3. A knife-edge bearing system as set forth in claim 2, wherein said first, second, third and fourth magnets are cylindrical with axially spaced magnetic poles, and are so positioned that the axes thereof are substantially in alignment with the line of contact between said movable and stationary members, and are magnetized in the axial direction.

4. A knife-edge bearing system for use in a pickup arm system, comprising a pickup arm supporting member and a second supporting member for supporting said pickup arm supporting member for pivotal movement with respect thereto, a knife-edge element formed with one of said members the other of said members having a V-shaped groove for receiving therein said knife-edge element so that relative pivotal movement of said members in a vertical plane of an elongated pickup arm supported by said pickup arm support member, is provided first and second magnets attached to both ends of said pickup arm supporting member, and third and fourth magnets mounted in opposed relation with said first and second magnets respectively on said second supporting member, so that relative movement in a direction perpendicular to the axis of said pickup arm may be prevented by the repulsive forces interacting between said first and third and second and fourth magnets respectively.

5. A knife-edge bearing system as set forth in claim 4, wherein said second supporting member comprises a rectangular frame, and an L-shaped supporting member with an upright leg, a base said leg extending from the periphery of said base and said L-shaped member having an arm extending horizontally radially inwardly toward the axis of said base, said frame being rotatably mounted between said base and said arm of said L-shaped member.

* * * * *